United States Patent
Šonský

(10) Patent No.: US 12,151,275 B2
(45) Date of Patent: Nov. 26, 2024

(54) DEVICE FOR STRENGTHENING THE SURFACE OF PRODUCTS, METHOD AND USE THEREOF

(71) Applicant: USTAV TERMOMECHANIKY AV CR, V.V.I., Libeň (CZ)

(72) Inventor: Jiří Šonský, NováHuť (CZ)

(73) Assignee: USTAV TERMOMECHANIKY AV CR, V.V.I., Liben (CZ)

( * ) Notice: Subject to any disclaimer, the term of this patent is extended or adjusted under 35 U.S.C. 154(b) by 129 days.

(21) Appl. No.: 17/802,855

(22) PCT Filed: Feb. 26, 2021

(86) PCT No.: PCT/CZ2021/000009
§ 371 (c)(1),
(2) Date: Aug. 26, 2022

(87) PCT Pub. No.: WO2021/170156
PCT Pub. Date: Sep. 2, 2021

(65) Prior Publication Data
US 2022/0402013 A1 Dec. 22, 2022

(30) Foreign Application Priority Data

Feb. 28, 2020 (CZ) .............................. CZ2020-103
Feb. 23, 2021 (CZ) .............................. CZ2021-82

(51) Int. Cl.
| | | |
|---|---|---|
| *B21D 31/06* | (2006.01) | |
| *B23P 9/04* | (2006.01) | |
| *B24C 1/10* | (2006.01) | |
| *B24C 5/08* | (2006.01) | |
| *C21D 7/06* | (2006.01) | |
| *H05H 1/52* | (2006.01) | |

(52) U.S. Cl.
CPC .............. *B21D 31/06* (2013.01); *B23P 9/04* (2013.01); *B24C 1/10* (2013.01); *B24C 5/08* (2013.01); *C21D 7/06* (2013.01); *H05H 1/52* (2013.01); *H05H 2245/40* (2021.05)

(58) Field of Classification Search
CPC ... B21D 31/06; B23P 9/02; B23P 9/04; B24C 1/10; B24C 5/08; C21D 7/06; Y10T 29/479; H05H 1/52; H05H 2245/40
See application file for complete search history.

(56) References Cited

U.S. PATENT DOCUMENTS

| | | | |
|---|---|---|---|
| 2007/0075062 A1 | 4/2007 | Hackel | |
| 2010/0132194 A1* | 6/2010 | Webster | C21D 7/04 29/889.7 |
| 2015/0336153 A1* | 11/2015 | Vivek | B23K 20/08 72/60 |

FOREIGN PATENT DOCUMENTS

| | | |
|---|---|---|
| CN | 107634178 A | 1/2018 |
| CN | 112143865 A | 12/2020 |
| JP | 2005271136 A | 10/2005 |

OTHER PUBLICATIONS

PCT International Search Report and Written Opinion in PCT/CZ2021/000009 mailed Jul. 5, 2021, 11 pages.

* cited by examiner

*Primary Examiner* — Matthew P Travers
(74) *Attorney, Agent, or Firm* — Servilia Whitney LLC

(57) ABSTRACT

A method and a device for strengthening the surface of workpieces, in particular of metal ones, by mechanical effects accompanying the impact of small projectiles or by mechanical effects accompanied by the impact of a shockwave induced by plasma created by electric evaporation of a metal foil are described.

20 Claims, 14 Drawing Sheets

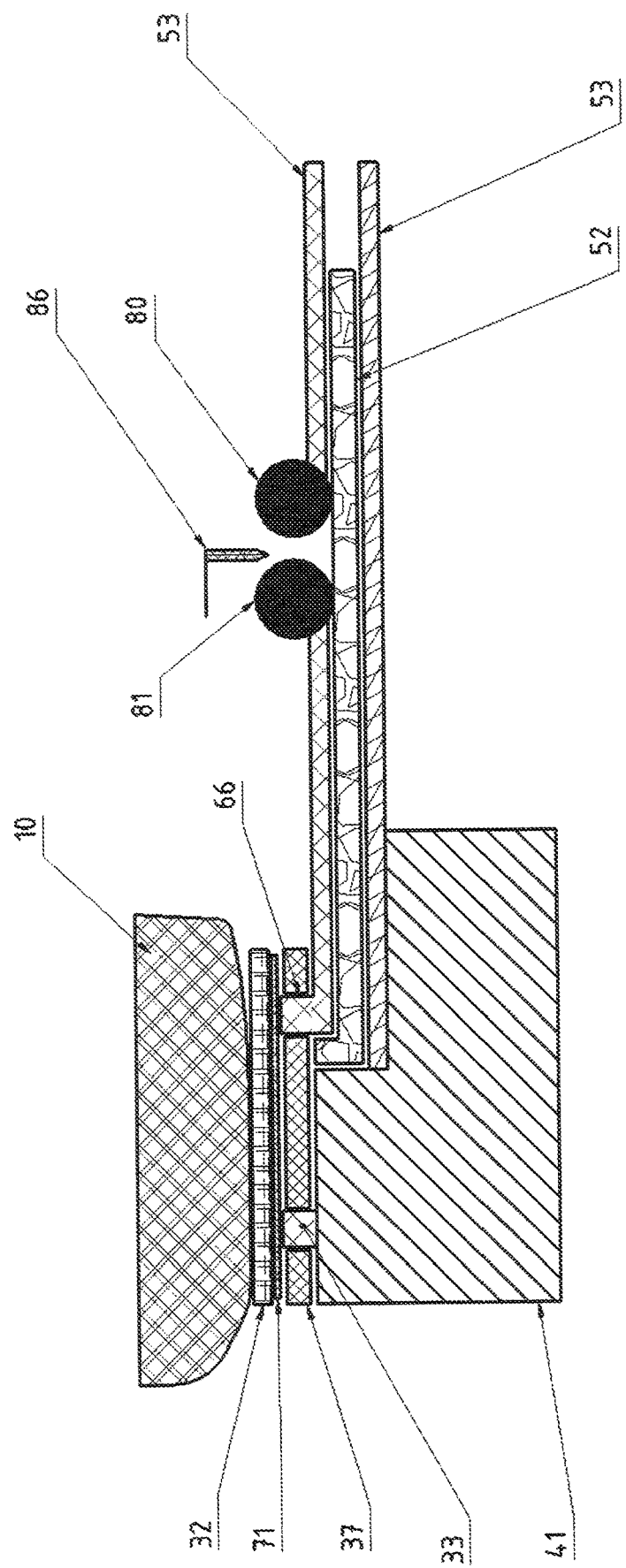

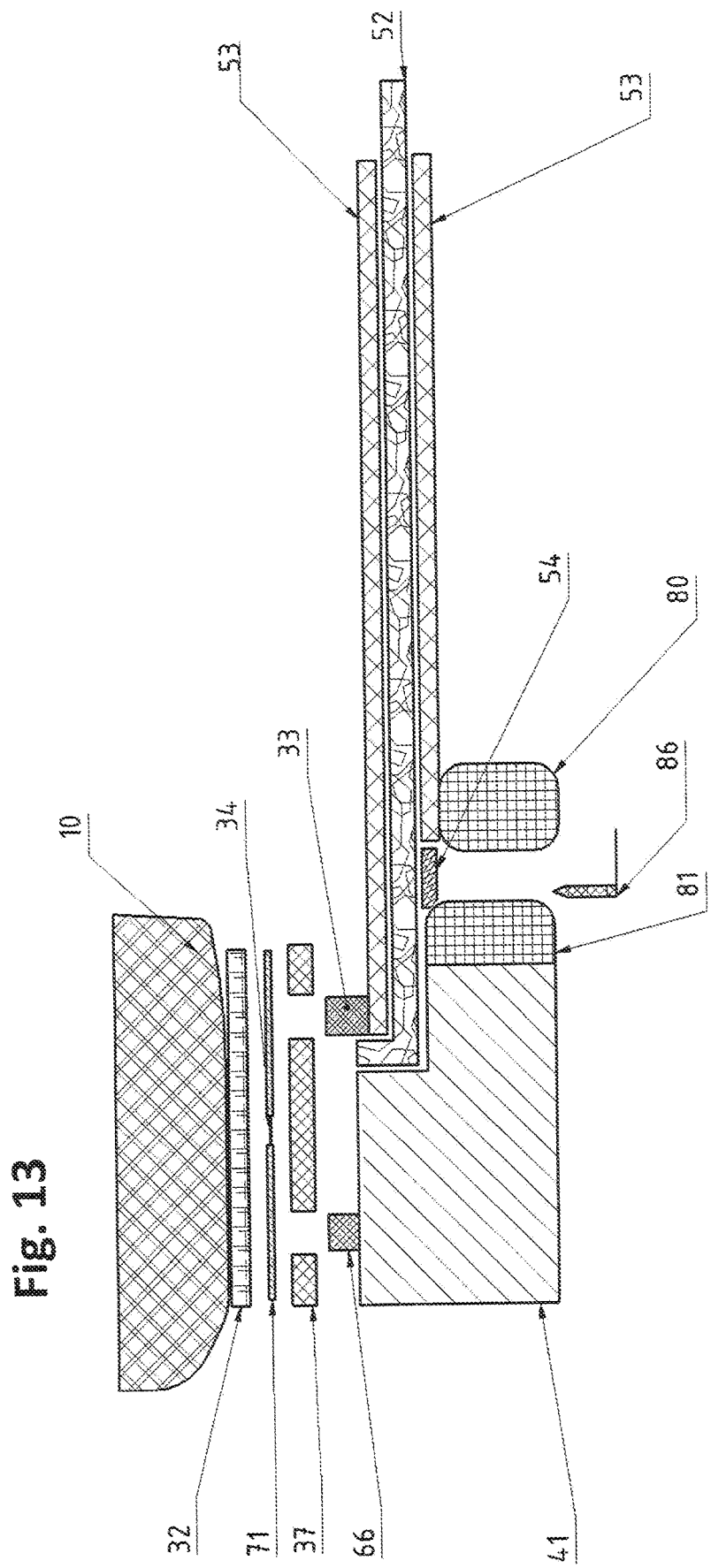

DEVICE FOR STRENGTHENING THE SURFACE OF PRODUCTS, METHOD AND USE THEREOF

CROSS-REFERENCE TO RELATED APPLICATIONS

This application is the National Stage entry of International Application No. PCT/CZ2021/000009, filed on Feb. 26, 2021, which claims priority to Czech Patent Application No. PV 2021-82, filed on Feb. 23, 2021, and Czech Patent Application No. PV 2020-103, filed on Feb. 28, 2020, the disclosures of which are incorporated herein by reference in their entireties.

FIELD OF THE INVENTION

This invention relates, on the one hand, to a method of strengthening the surface of workpieces, in particular metal ones, by mechanical effects accompanying the impact of small projectiles or by mechanical effects accompanying the impact of a shock wave caused by a plasma caused by electrical evaporation of a metal foil. The invention further includes a device for performing this method. The impact of the projectile induces plastic deformations in the surface layer of the workpiece which introduce residual mechanical stresses. These cause a significant improvement in the functional mechanical properties of the final product. The general application of the invention is destined for engineering production, particularly in the aerospace industry and in general wherever mechanically highly stressed components, endangered for example by fatigue fractures, are manufactured.

BACKGROUND

Numerous technological procedures and methods are known for improving the mechanical properties of manufactured products by acting on the surface layers of manufactured workpieces, especially made of metallic materials. This increases the mechanical, cavitation, adhesion, and corrosion resistance of the surface. These methods are generally based on the principle of changing the stress in the surface layers by introducing a suitable level of compressive residual stress and its depth gradient below the surface. Such a method of surface strengthening is, for example, shot peening, where projectiles impacting the workpiece surface are accelerated steel balls. The method is quite commonly used, but the achievable values of residual stresses and the affected depth of the material are not great. Therefore, more advanced methods are being introduced today, such as surface strengthening by the action of a beam of light rays generated by a power laser impinging on a liquid-covered workpiece surface. The short irradiation of this high-power light beam generates a shock and deformation wave on the workpiece surface, which causes the material to strengthen. New technologies like this have significant potential for increasing the service life of critically stressed parts, such as aircraft and rocket engines, space device structures, steam turbine blades, high-performance pump impellers, nuclear reactor vessels and many more.

Although the above-mentioned advanced laser technology is already used in industry, its wider use is hindered by very high investment and operating costs. These costs spent on laser surface reinforcement often account for a significant percentage of the price of the entire product. It is also necessary to overcome several complications, such as the need for direct optical access to the surface to be treated and the need to cover it with a layer of liquid.

SUMMARY OF THE INVENTION

The mentioned problems with the hitherto known technologies of improving the mechanical properties of workpieces by acting on their surface are eliminated by the method of strengthening the surface of workpieces by the impact of projectiles and the associated introduction of residual stresses to the surface layer according to the invention, characterized by a process in which a projectile, made of a polymeric material particularly in the form of a polymer strip, is directed at the surface of the workpiece and allowed to impact on it, wherein a metal foil is previously applied to the polymer strip, and an electric current pulse is introduced by the discharge of the capacitor, and the pulse is large enough that it melts the metal foil, evaporates it and subsequently turns it into an expanding plasma which, at least partially by its expansion pressure, accelerates said projectile in the direction against the surface of the workpiece being treated.

According to the invention, it is also expedient to carry out the process according to the invention the essence of which is that the plasma generated by the electric current pulse, in addition to the expansion pressure, is also accelerated by the electromagnetic Lorentz force caused by the passage of an electric current through this plasma in the generated magnetic field.

According to the invention, it is also expedient to carry out the process according to the invention the essence of which is that the projectile is guided in the direction of the workpiece surface through a channel inside the nozzle.

According to the invention, it is also expedient to carry out the process according to the invention the essence of which is that the strengthening of the workpiece surface is performed in periodically repeated functional cycles, where, at the beginning of each cycle, the polymer object, in particular in the form of a strip, is displaced in the direction of its length by one spacing distance between the bridges, which had previously formed in the metal foil on the polymer strip and created by local narrowing of the metal foil, and then the movement of this strip is stopped for the rest of the cycle in order to create plasma by electric discharge.

In particular, it is expedient to use the device according to the invention. for carrying out this method, the essence of which is that against the surface of the workpiece there is positioned the surface of a polymer object, in particular in the form of a polymer strip, on the surface of which on the side diverted from the surface of the workpiece is a metal foil with bridges and this metal foil is in electrical contact with two electrodes, on the one hand by the first electrode and next to it, in particular in the direction of the length of the polymer strip, by the second electrode between which there is a bridge and where each of the two electrodes is an electrical conductor, the first electrode with the first conductor and the second electrode with the second conductor with one of two capacitor electrode plates which are on opposite sides of the dielectric, and these conductors are connected, one of them via a switch to the outputs of the high voltage source.

It is also expedient for this method to be carried out in the device according to the invention, the essence of which is that between the surface of the workpiece and the opposite part of the metal foil, there is situated a nozzle directed with its mouth against the surface of the workpiece and with its inner channel against the surface of the polymer object, which predominantly has the shape of a polymer strip passing through the active part of the displacement mechanism.

It is also expedient for this method to be carried out in the device according to the invention, the essence of which is that the switch comprises a spark gap input, a spark gap output, and an air gap between them.

It is also expedient for this method to be carried out in the device according to the invention, the essence of which is that the electrical conductors are flat in shape, with a width greater than the thickness. To convey the required mechanical stresses to the surface layer of metal objects, a shock wave strong enough to cause plastic deformation of the material in the workpiece surface is generated. To do this, it is necessary to achieve very high compressive forces. The energy required for this is first gradually accumulated in a capacitor, after the discharge of which it is transferred to the plasma formed by ionization from an electrically conductive foil bridge in a few tens of nanoseconds. The expanding plasma converts the supplied energy into the kinetic energy of the projectile. This is thus accelerated to a high speed of several kilometres per second against the workpiece, to which it transfers a substantial part of this energy. Generally, the treatment of larger areas is required, and this needs a rapid repetition of many projectile impacts in a computer-controlled process.

The solution according to the invention illustrated in FIGS. 12 to 14b and presented in Examples 5 and 6 consists in particular in the following modifications of the embodiments according to Examples 1 to 4:
  the switch comprises on the one hand a spark gap input connected to the first conductor and on the other hand a spark gap output connected to the same conductor; furthermore, it has a gap between them, and/or
  between the surface of the workpiece and a part of the metal foil, the polymer strip is in direct contact with the surface of the workpiece and this polymer strip, mechanically connected to the metal foil, passes through the active part of the displacing device, and/or
    the electrical conductors leading from the capacitor to the electrodes are flat in shape, with a width greater than the thickness, one of these electrical conductors being in its part at the same time a capacitor electrode plate and the other conductor being interrupted by a switch.

The advantage of the proposed solution is the fact that the workpiece surface is not contaminated with foil bridge ablation products, as the polymer strip protects it. The length of the pressure pulse induced by the expansion of the plasma can be varied by the electrical parameters of the circuit, which together with the possibility to increase the treated area with one shock wave allows the layer to be affected to a greater depth.

To introduce the required mechanical stresses into the surface layer of metal objects, the electric capacitor discharge generates a shock wave strong enough to cause plastic deformation of the material in the surface of the workpiece. To do this, it is necessary to achieve very high compressive forces. The energy that makes this possible is first gradually accumulated in the capacitor and, after its discharge, is transferred to the plasma formed by ionization from an electrically conductive foil bridge over a period of several tens to hundreds of nanoseconds. The expanding plasma converts a part of the supplied energy into a shock wave, which is fed directly to the workpiece via the polymer strip, so that no plastic projectiles are formed as in the case of the embodiments in Examples 1 to 4. In general, the treatment of larger areas is required, and for this it is necessary to quickly repeat the impact of many shock waves on preselected areas of the workpiece surface in a computer-controlled process. Fast cycle repetition is ensured by mechanical displacement of the polymer strip carrying the new foil bridges and its fixation by pressing it against the selected place of the workpiece before the discharge of the capacitor is carried out.

Due to the very fast discharge of the non-inductive capacitor into the foil bridge, a plasma is formed by evaporation and ionization of this bridge. The generated plasma, by its expansion, creates a shock wave guided through the polymer strip into the surface of the workpiece, which is in direct contact with the assembly 32, 34, 37 and 41. This shock wave causes a plastic deformation of the surface layer of the workpiece and thus leaves residual compressive stress in it.

According to the invention, it is also expedient to carry out the method according to the invention, the essence of which is that the plasma generated by the electric current pulse is additionally trapped between the workpiece and the support body and thus the plasma expansion pressure increases.

According to the invention, it is also expedient to carry out the method according to the invention, the essence of which is that the plasma generated by the electric current pulse is isolated from the workpiece and/or from the support body by a polymer layer.

It is also expedient according to the invention to carry out the method according to the invention, the essence of which is that the strengthening of the workpiece surface is carried out in periodically repeated functional cycles, wherein at the beginning of each cycle, the assembly 32, 34 and 37 is displaced in the direction of its length by one spacing distance between the bridges previously created in the metal foil on the polymer strip formed by its local narrowing, and then the movement of this belt is stopped for the rest of the cycle to effect plasma formation by the electric discharge.

DESCRIPTION OF DRAWINGS

The accompanying figures schematically show alternative embodiments of a shock wave generator for strengthening the surface layer of materials according to the invention. In addition, there is an explanatory picture in FIG. 5. This explains the direction in space of the Lorentz force used in the invention. The first exemplary embodiment shown in FIG. 1 serves here mainly to clarify the functional principle and therefore some details which are not essential for this explanation are omitted for the sake of simplicity. Only in the further illustrations in FIGS. 2, 3 and 4 is the arrangement that is practically applicable. Other directly applicable embodiments are shown in FIGS. 6, 7 and 8 on the one hand and in FIGS. 9, 10 and 11 on the other.

In an alternative preferred embodiment overcoming some of the disadvantages of the solution according to FIG. 6, these shock waves are used for the strengthening of the surface layer of metallic materials according to the invention. These are schematic illustrations, which serve mainly to clarify the functional principle of the examples of the design of this device, and therefore for the sake of clarity and simplification, some details that are not essential for this explanation are omitted, for example, mechanical displacement of a polymer strip with foil bridges and a transverser for treatment of a preselected location of the workpiece surface.

Figure 1:
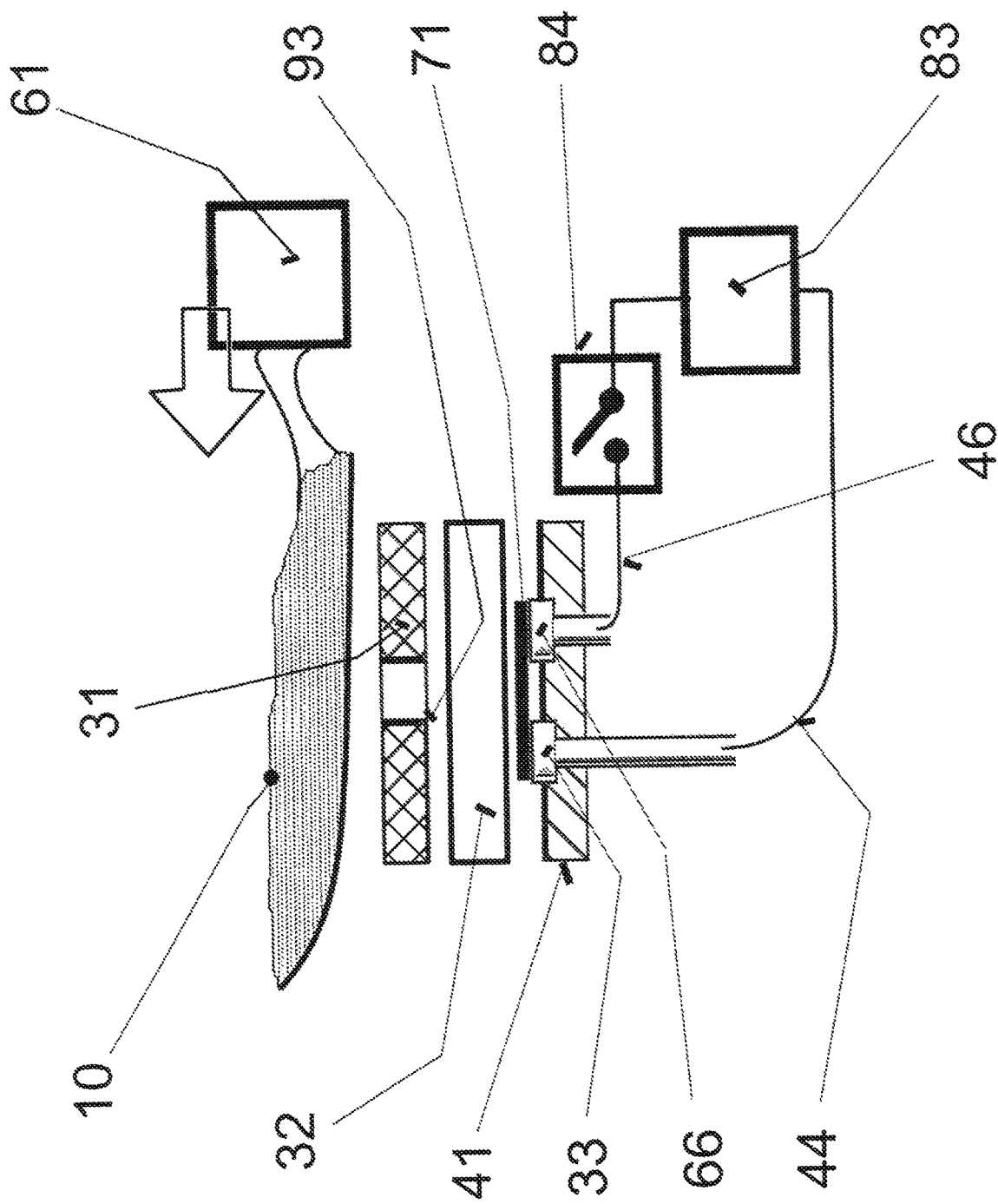

For clarity, the scale is also different in the x and y axis, because the capacitor and the connecting tape line are laminated with foils with a maximum thickness of tens of micrometres, which would be very confusing in the drawings.

FIG. 12 shows a diagram of a device according to the first preferred variant embodiment according to the invention.

FIG. 13 shows a diagram of a device according to the second preferred variant, embodiment according to the invention.

Figure 14B:
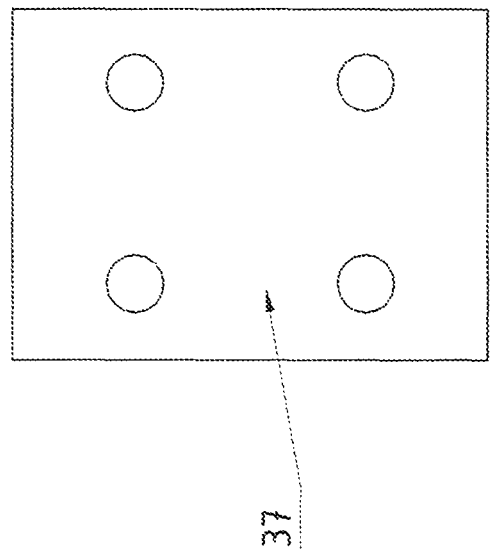
Figure 14A:
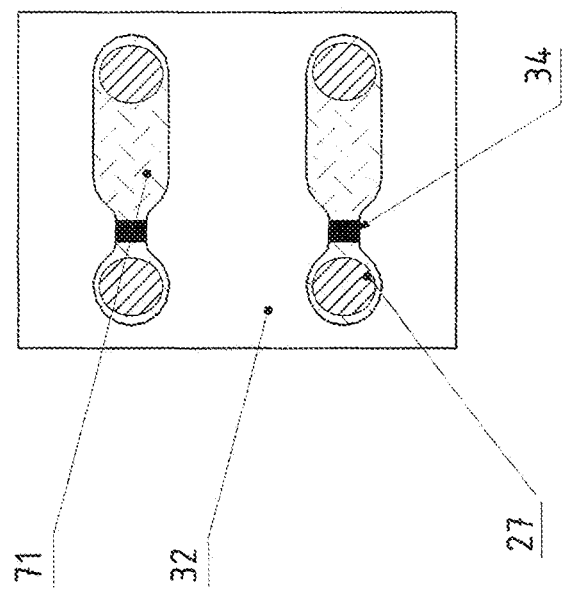

FIGS. 14a and 14b show a detail of a polymer strip provided with a metal foil.

FIG. 14a shows the construction of a polymer strip 32 with a metal foil 71. In this case the strip is always displaced between the individual pulses by a spacing between the bridges 34 in a direction perpendicular to the plane shown in FIGS. 12 and 13.

FIG. 14b shows an insulating layer 37, with openings for the electrodes 33 and 66, protecting the support body 41, which is necessary for the correct functioning of the device according to both variant embodiments, further described in Examples 5 and 6. In this case, all three layers are firmly joined together so that the metal foil 71 with bridges 34 lies between the layers of the polymer strip 32 and the insulating layer 37.

FIG. 14a shows only two pieces of the metal foil 71 with bridges 34 and their corresponding openings in the insulating layer 37 shown in FIG. 14b. In practice, however, it will be a long strip with a large number of pieces of metal foil 71 with bridges 34. Alternatively, it can be arranged longitudinally, but then it is moved between pulses in the direction of the x-axis—FIGS. 12 and 13.

EXAMPLES FOR AN EMBODIMENT OF THE INVENTION

Example 1

In this example of the simple embodiment according to FIG. 1, in the upper part of the figure there is a detailed part of the workpiece 10 being strengthened, while the device itself for applying the required residual stresses to the surface layer of this workpiece 10 is shown in the lower part of FIG. 1. In this figure, the trajectories of the fired projectiles 100 thus lead vertically upwards. Significant components of the device in this exemplary embodiment have an axially symmetrical circular shape. They are drawn. in the figure in a section in a vertical plane passing through the axis of symmetry. In reality, these components are in close contact with each other and are firmly connected together at the time of the strengthening process. Nevertheless, for the sake of clarity of the illustration in FIG. 1, these components are drawn vertically offset relative to one another, so that an air gap is visible between them in the figure. These components are, viewed from top to bottom, first (a) a circular disk of the nozzle body 31—which is in principle not necessary, but whose use improves the functional parameters of the device. Below the nozzle 31. there is then (b) inserted a polymer strip 32, which may differ in shape, but in this case, it also has the shape of a circular disk substantially the same as that of the nozzle body 31. At the bottom, (c) the support body 4i1 is preferably also in the shape of a circular disk.

The metal foil 71 abuts the polymer strip 32 from below. It rests on the bottom with two electrodes, the first electrode 33 and the second electrode 66. Both are mounted in a support body 41. For directing and accelerating the projectiles 100 formed, the nozzle 31 has a through hole in the middle in the direction of its axis of symmetry. It is oriented with its upper end against the surface of the workpiece 10 being strengthened. Unlike other conventional nozzles, which have a rounded inlet into their through hole, here the nozzle body 31 has a sharp edge 93 at the inlet of the lower edging of this hole. The metal foil 71 may be in the form of a flat strip of constant width and thickness, but preferably it has a local narrowing between the two electrodes 33 and 66. The function of the device is ensured by the electrical circuit drawn in the lower right part of this FIG. 1. In particular, there is a high voltage source 83 made by known methods and there is also a switch 84 which is also in a known embodiment usually made for switching large currents and voltages. The electric current from the high voltage source 83 is conducted to the first electrode 33 by the first conductor 44. In contrast, from the switch 84, the current from the second terminal of the high voltage source 83 is similarly conducted to the second electrode 66 by the second conductor 46.

By closing the switch 84, a high voltage is applied between the two electrodes 33 and 66. However, the circuit is short-circuited by the metal foil 71. This causes a high-intensity electric current to flow through the circuit for a short time. By ohmic heating, the metal foil 71 first melts in an extremely short period of time and then immediately evaporates. Subsequently, a plasma is formed from these metal vapours. The plasma expands and at the same time exerts a high compressive force on the polymer strip 32 upwards, against the nozzle 31. The central part of the polymer strip 32 is cut out by the sharp edge 93 and only this part proceeds upwards. The cut-out part thus shaped into a disk is pushed through the through hole in the nozzle 31. It then flies out of this opening at the top like a projectile 100, which impacts the surface of the workpiece 10 and creates a shock wave in it, causing the desired deformation, and leaves residual stresses.

Example 2

Figure 3:
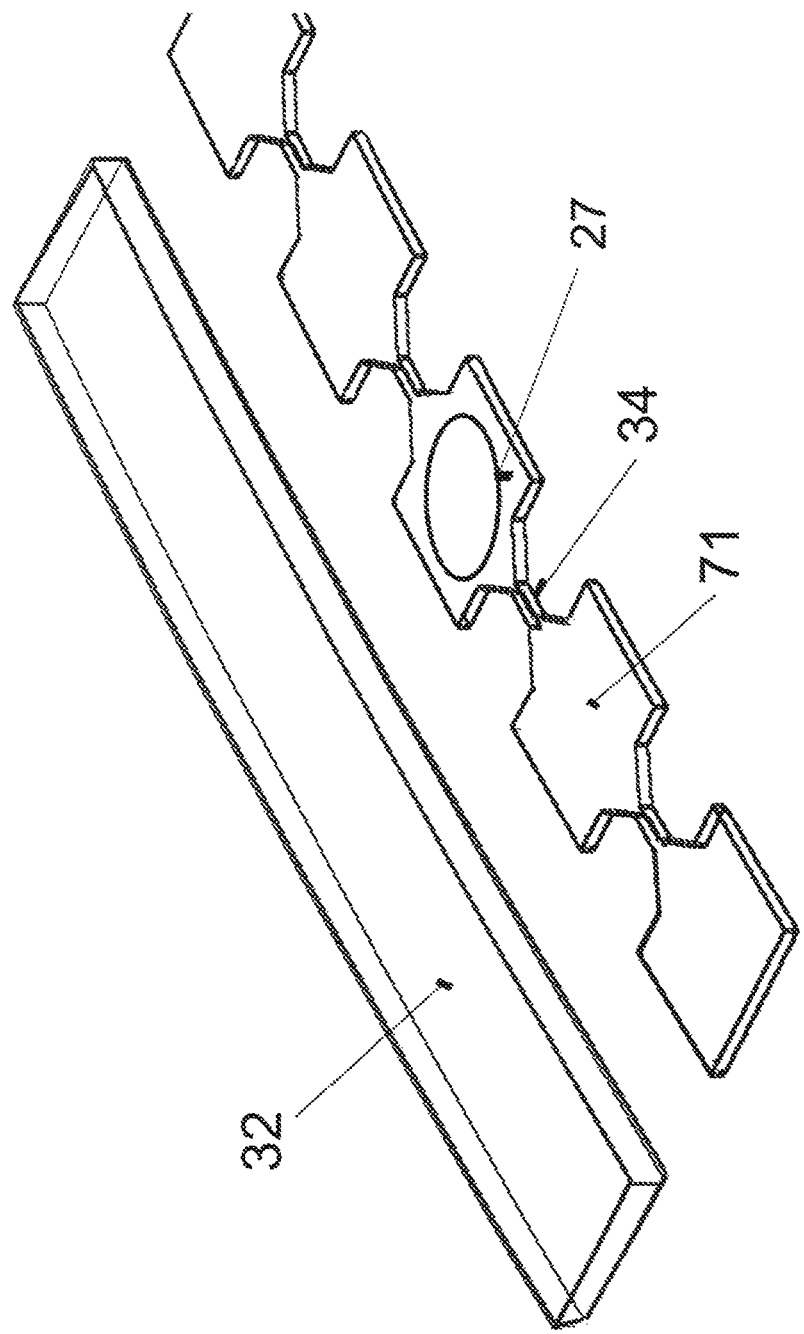
Figure 4:
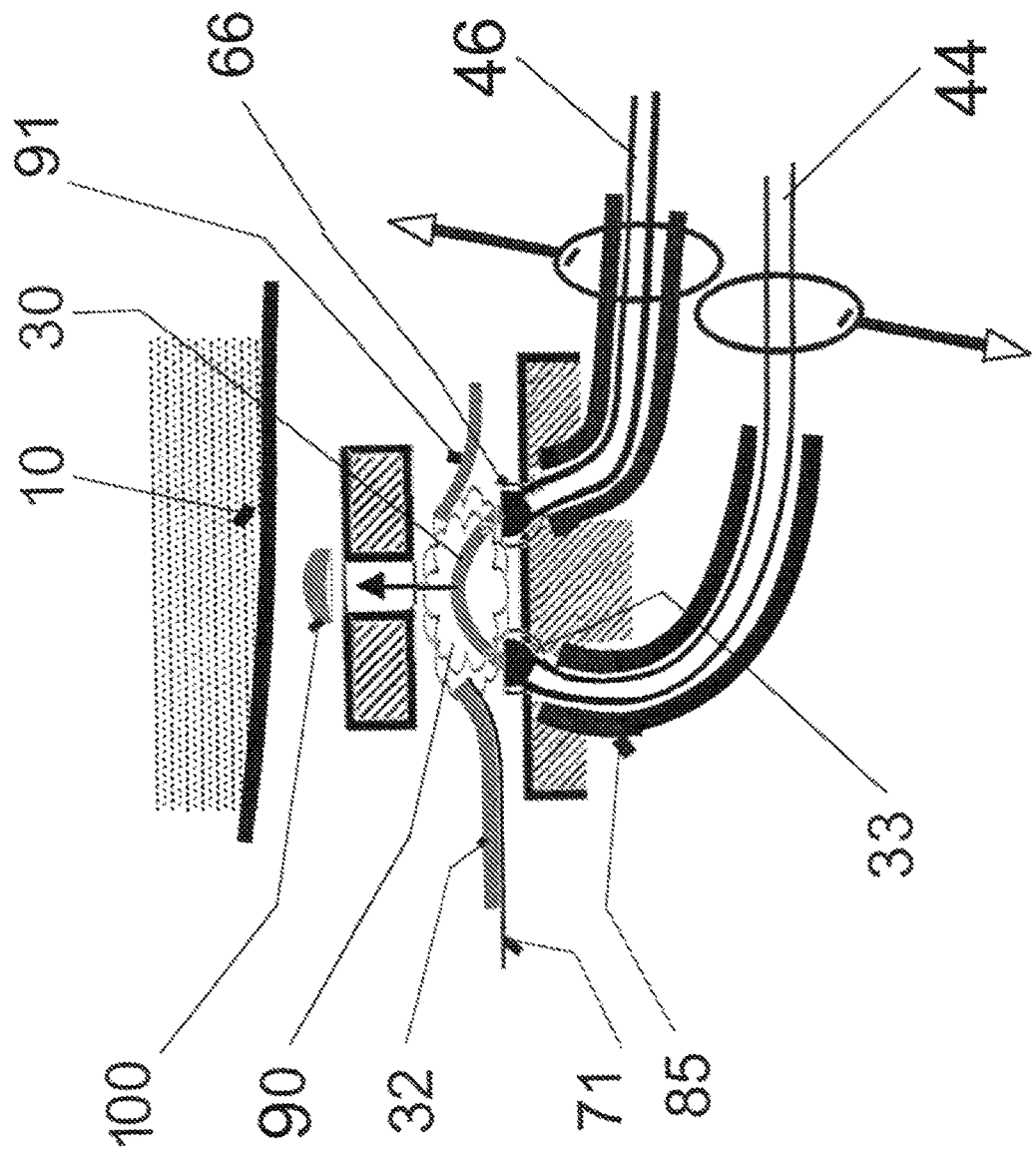

The simple first embodiment according to FIG. 1 is intended primarily to explain the basic principle of creating projectiles 100 in the device according to the invention. It is adapted for use in practical engineering production, for example, as indicated in FIGS. 2, 3 and 4.

Figure 2:
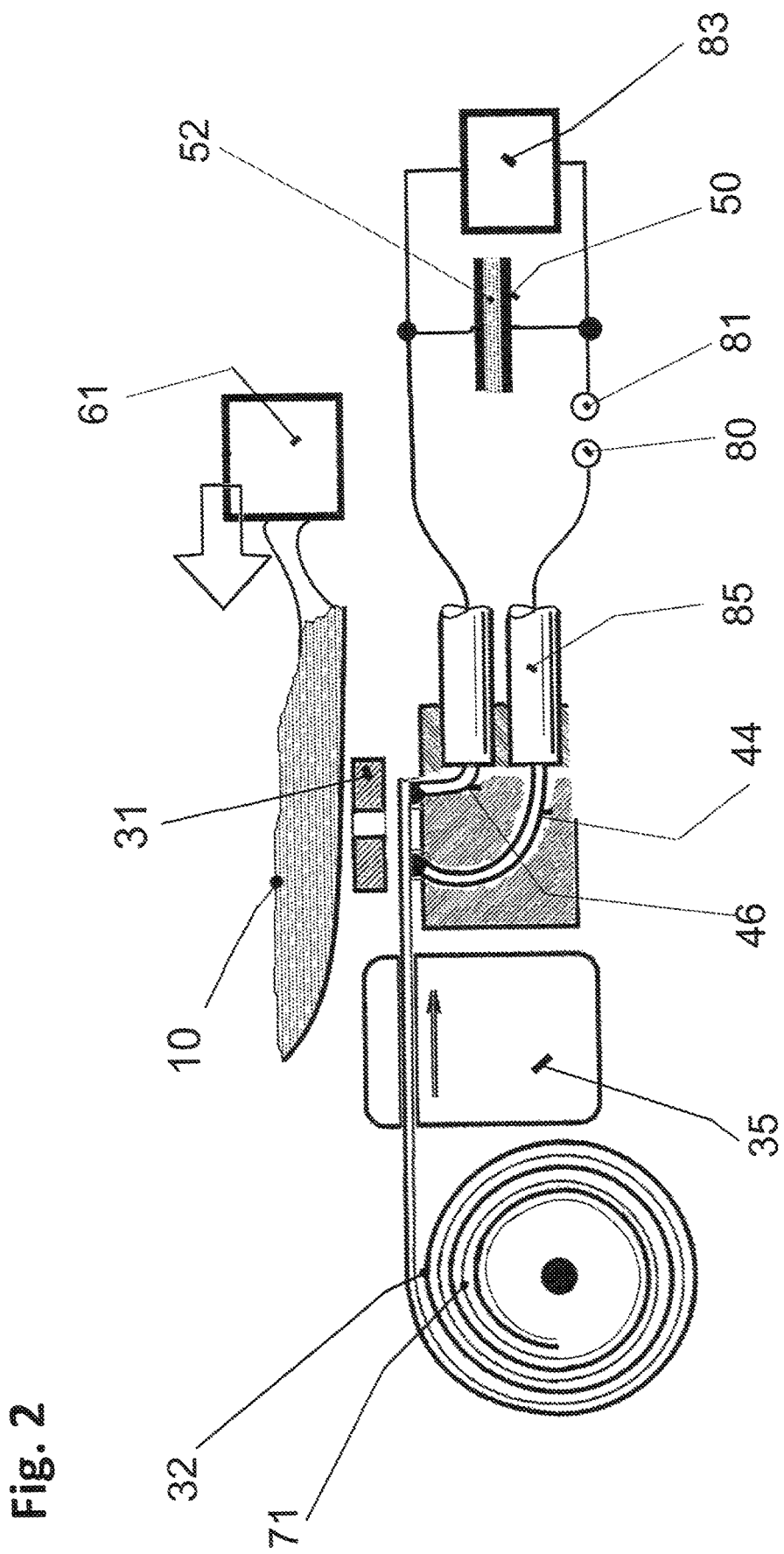

As in FIG. 1, there is also a part of the strengthened workpiece 10 at the top of FIG. 2, while the actual device for forming the projectiles 100 is at the bottom of the Figure. It performs periodically repeated generation and acceleration of many successively generated projectiles 100 in rapid succession. In this embodiment, an additional force effect on the accelerated plasma is also created, in addition to the basic temperature expansion. Finally, also in this exemplary embodiment, the electrical circuit is adapted to achieve an extremely high short-term electrical output at a given level of supplied electrical energy.

In this arrangement, the formed and accelerated projectiles 100 are thus repeatedly fired so that they gradually leave the nozzle 31 upwards. The nozzle 31 is not necessary, but it improves the acceleration and direction of the flying projectile 100 because it concentrates the electric charge carriers in the plasma and prevents them from escaping to the sides. As in FIG. 1, for this guidance and acceleration of the projectiles 100, the nozzle 31 has an opening in the middle for the passage and acceleration of the fired projectiles 100. For rapidly repeated generation of the projectiles 100, a polymer strip 32 supplying material for the projectiles 100 enters the device from the left. Its upper side closely abuts the lower side of the nozzle 31. There is also a thin metal foil 71. as in FIG. 1. In this case, it is firmly connected to the underside of the polymer strip 32. It is formed directly on the underside of the polymer strip 32 by vapour deposition, pressing or similar known techniques. The actual polymer strip 32 drawn at the top of FIG. 3 has a constant width and thickness along its entire length. In contrast, as shown in the lower part of FIG. 3, this metal foil 71 is locally narrowed into the bridges 34 at periodically recurring longitudinal distances. This can be carried out on the polymer strip 32, for example, by vacuum deposition of evaporated material through a suitably shaped mask or by etching off unwanted portions of the pattern. As also shown in FIG. 3, a metal foil 71 is left between the individual bridges 34 in its full width equal to the width of the polymer strip 32 to form sufficiently large contact surfaces 27 on which the first electrode 33 rests on one side of the bridge 34 and next to it, in particular in the direction of travel of the polymer strip 32, the second electrode 66 abuts.

Mechanically but not electrically, both electrodes are connected to the stationary support body 41 so that they remain immovable even when the device is operating. They protrude slightly above the upper surface of the support body 41 and are thus in electrical contact with the metal foil 71 in the initial state of the functional cycle. The polymer strip 32 is long because it must contain material to form many successively formed projectiles 100. Therefore, to save space, this polymer strip 32 with the metal foil 71 formed thereon is wound in a spiral, as shown in the left part of FIG. 2. This spiral gradually rotates and unfolds during the operation of the device. The displacement device 35 through which the polymer strip 32 passes serves to induce this movement. It is carried out in one of the commonly known arrangements. Also, in this case, below the supplied polymer strip 32 there is a support body 41, firmly connected to the stationary parts of the whole device. The polymer strip 32 is made of an electrically non-conductive material such as bi-axially oriented PET (polyethylene terephthalate) or polyimide (Kapton). Together with the attached or directly formed metal foil 71, the polymer strip 32 progressively moves in the direction of the length of the strip in steps corresponding to the distance between the two electrodes 33, 66. The electrical conductors 44, 46 shown in FIG. 2 lead to the electrodes 33, 66 through openings formed in the support body 41. They are the first conductor 44 and the second conductor 46, both provided with very effective electrical insulation 85, since extremely high demands are placed on it. It must be a material with extremely high dielectric strength, as the process involves high voltages and very small distances between the two conductors 44, 46. It must be ensured that plasma is generated only between the pair of adjacent electrodes. The two electrodes 33, 66 protrude slightly above the upper surface of the support body 41 to ensure their electrical contact with the contact surfaces 27 of the supplied metal foil 71. At their opposite end, these conductors lead to the foil 53 of the capacitor 50. Here, the capacitor serves to store, in a short time in each of the repeated functional cycles, the electrical energy used at the end of each cycle to generate the plasma and then the projectile 100. To store this energy, the capacitor 50 is charged from the high voltage source 83 during the initial phase of each cycle. In this case, the high voltage source 83 is a relatively complex but generally known electrical device.

In this case, an important requirement for the electrical circuit is the extremely low inductance of all circuit components. The lower its value, the shorter the duration of the discharge from the capacitor 50 and the higher the value of the instantaneous maximum electrical power supplied to the bridge 34. These are mainly three components of possible parasitic inductance, which is suppressed by the design. On the one hand, it is a part of it which could be present in the capacitor 50 since capacitors 50 are not normally designed for the requirement of extremely low inductance. Furthermore, it is a component of the inductance of the leads to the electrodes 33 and 66. It is necessary that the leads be as short and flat as possible with a minimum distance between them. Finally, it is the component present in the electrical switch 84 that is required at the outputs of the capacitor 50 to start by its closing the plasma explosion process 90. Therefore, it may be extremely expedient for both the capacitor 50 and the conductors 44, 46 to the electrodes 33 and 66 to be made as flat as possible, with the smallest possible dielectric thickness between them. FIG. 2 shows an arrangement where this problem of low inductance in the switching process is solved in such a way that the switch 84 is designed as a spark gap. The electric current does not pass through this spark gap at all when the capacitor is being charged.

Both its parts, the spark gap input 80 and spark gap output 81 are separated from one another by air or another suitable dielectric gas. Only when the voltage difference between the input of the spark gap 80 and the output of the spark gap 81 exceeds the value of the electrical strength of the air, will a very short-term electrical connection be established with the passage of electric current. Thus, the spark gap essentially functions as an automatically operating switch 84. Alternatively, the spark gap can be controlled by an auxiliary electrode and switched by a high voltage pulse.

As for the required extremely low value of the inductance of the capacitor, it is achieved by its unusual arrangement. It is a planar thin dielectric plate 52 provided on both sides with capacitor plates 53.

The metallic material of the bridge 34 from which the plasma is formed may be copper, aluminium or gold, which is not a cost problem at all due to the small amount required. Suitably, the surface density of the bridge 34 is comparable to the surface density of the polymer strip 32 from which the projectile 100 is formed. Thus, efficient transfer of momentum is ensured.

An important role is played by the support body 41, which can have the character of a relatively thin plate. It serves to capture the kickback and prevent the expansion of the plasma in the opposite direction from the workpiece 10. The presence of the support body 41 increases the efficiency of the energy transfer to the projectile 100. Since the thickness of the foil bridge 34 is small, typically from units to a few tens of micrometres, the side gap between the surface of the support body 41 and the polymer strip 32 is negligible as far as plasma leakage is concerned.

The nozzle 31 can also be made of polymeric materials, but its service life is very short, and it must be replaced frequently—for example, a new nozzle 31 formed together with bridges 34 of metal foil 71 on the supplied polymer strip 32 can be inserted into the device after each functional cycle. However, if the nozzle 31 is to have a long service life without frequent replacements, it must be made of ceramic materials with high density and toughness. Zirconium dioxide materials are particularly suitable. However, if the capacitor 50 is well adapted to the electrical load formed by the bridges 34, which is also desirable from the point of view of energy efficiency of the device, it is possible to make the nozzle 31 of metal, because the discharge of the capacitor 50 takes place so fast that the polymer strip 32 does not break before the end of the electric current pulse. Suitable materials for the construction of the metal nozzle 31 have a high melting point, high density, and high hardness. Tungsten and molybdenum are particularly suitable. If coolant flow cools through internal cooling channels is used, it is desirable that the material also have high thermal conductivity.

To improve the properties of the workpiece 10 over larger surface areas, the workpiece must move in small steps between the individual functional cycles, i.e., at the beginning of each functional cycle it is moved by the traverser 61. The newly strengthened place is always in front of the mouth of the nozzle 31 so that the projectiles 100 flying out of the nozzle 31 hit successively determined places of the workpiece surface 10.

To explain the ongoing process of creating a projectile and inducing its movement, FIG. 4 shows an enlarged view of the central part of the described device in which the explosion 90 is currently taking place. Similarly, to the previous figures, a part of the workpiece 10 being strengthened is shown at the top, while the device itself for applying the required stresses to the surface layer of this workpiece 10 is at the bottom of the figure. Electric conductors 44, 46 are shown with insulation 85 leading to electrodes 33 and 66.

This exemplary embodiment of a shock wave generator for strengthening a layer on the surface of the workpiece 10 according to the invention shown in FIGS. 2, 3 and 4 operates on the principle of inducing mechanical stresses by the impact of projectiles 100. These are generated and accelerated by the expansion of the plasma formed from the bridge 34, which is the narrowing of the metal foil 71. When just before or at the very end of the operating cycle, an electric discharge from a capacitor passes between the spark gap input 80 and the spark gap output 81, this electric current also passes through the metal foil 71 at the locations situated between the two electrodes 33 and 66. Due to the low electrical resistance of the bridge 34 and the high voltage on the charged capacitor 50, this current has an intensity in the order of kiloamperes. Extreme resistance heating occurs up to temperatures at which the bridge 34 not only melts but also immediately evaporates. Eventually, it is ionized when the metal vapour atoms lose some of their electrons.

All this is caused by the action of a strong short-term pulse of electric current from the capacitor 50 passing through the bridge 34 connected to the circuit via electrodes 33, 66. This is carried out repeatedly in equally long periodically repeated functional cycles. At the beginning of each cycle, there is no electrical voltage between the two capacitor plates 53 on opposite sides of its dielectric 52. The displacing device 35 responding to the discharge from the previous cycle begins to move the polymer strip 32 and gradually displaces it in the direction of its length by a distance equal to the distance between the electrodes 33, 66 and at the same time by the distances between the bridges 34. In this new position, the strip is then immobilized. This must be the position in which the bridge 34 is located between the first electrode 33 and the second electrode 66, both of which are in electrically conductive contact with the metal foil 71 at opposite ends of the bridge 34. Switch 84 is closed at the beginning of each cycle and current flows through it from the high voltage source 83. At the same time, the traverser 61 moves the workpiece 10 to a suitable position in which it also remains stationary for the rest of the operating cycle.

However, the electric current does not pass through the electrodes 33 and 66 because their circuit is interrupted by an air gap between the spark gap input 80 and the spark gap output 81. The capacitor 50 is charged from the high voltage source 83, and this is reflected in a gradual increase in electric voltage between the capacitor plates 53 located on opposite sides of its dielectric 52. This part of the operating cycle terminates when the voltage difference at the spark gap between the spark gap input 80 and the spark gap output 81 exceeds the value of the electrical strength of the air. It is said to have a value of 3 MV/m. This means that with a gap of 0.7 mm between the spark gap input 80 and the spark gap output 81, a discharge can be expected when a voltage in the capacitor 50 reaches typically 2-5 KV. The capacitor 50 can have a capacity in the order of μF units, so that with a discharge lasting around 50 ns, power of the order of tens of MW can be transferred to the plasma while the supplied energy amounts to the order of Joules units only.

Due to the high intensity of the flowing electric current, a strong magnetic field is generated around the conductors 44, 46. Its magnetic field lines of force are roughly in the shape of circles oppositely oriented to each other, as shown in the lower right part of FIG. 4. Similar lines of force are also formed around the electric arc 30 that is formed between the first electrode 33 and the second electrode 66. Thereby a large force acts on the electrons in the conductors, so oriented that it moves the conductors away from each other. The two metal conductors 44, 46 are therefore fastened in the device with a sufficient reserve of strength. However, this separating force also acts on the charge carriers in the electric arc 30 formed between the two electrodes 33, 66. These charge carriers are pushed by this force acting on them onto the cut-out part of the polymer strip 32 which is thereby—together with the expansion caused by the explosion 90—pressed into the through hole in the nozzle 31. The movement induced by these forces is desirable because inside the nozzle 31 it accelerates the projectile 100 towards the surface of the workpiece 10.

After each explosion» 90, the polymer strip 32 is moved by the displacing device 35 sc that there is always a new bridge 34 under the nozzle 31. The whole process can thus be repeated quickly and therefore a large surface of the workpiece 10 can be treated in a short time. For high repetition rates, it is then necessary to ensure suitable cooling not only of the nozzle 31 but also of the support body 41 and the spark gap or other switching element, such as a cascade of IGBT transistors. The polymer strips 32 can be manufactured by commonly available flexible printed circuit board manufacturing technology. The part from which the projectile 100 is formed is separated by cutting with a sharp edge 93 formed on the inlet edge of the hole in the nozzle 31. The marginal residue of polymeric material is ejected from the device as polymer waste 91, which can be recycled.

Explanatory Picture

Figure 5:
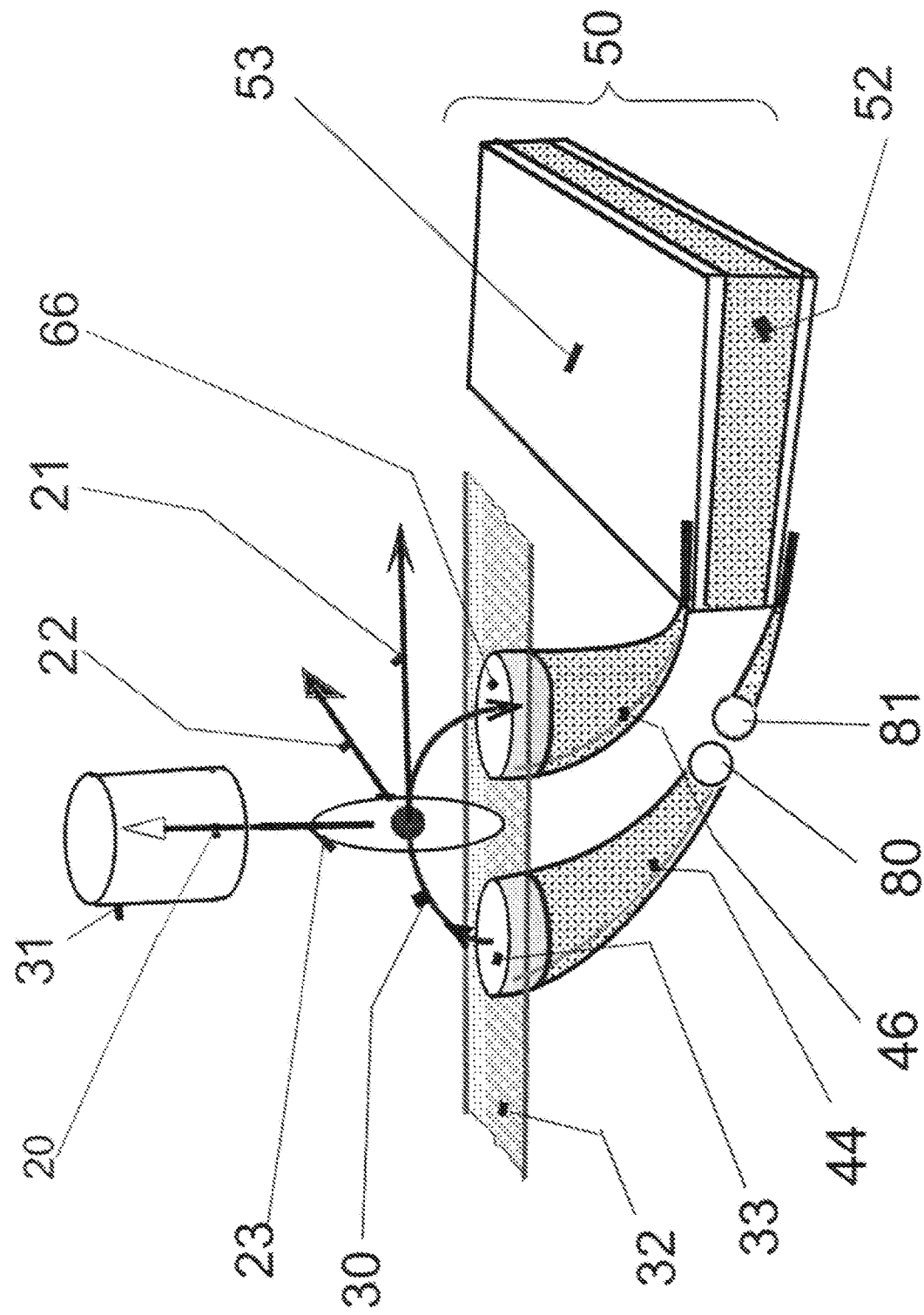

FIG. 5 essentially shows a schematic diagram of the device according to the invention, but in contrast to the exemplary embodiments, the purpose of FIG. 5 is not to show the actual shapes of the individual components of the device. The aim is to illustrate the explanation of the forces generated during the operation of the device. Specifically, it describes the principle used to generate the Lorentz force, which acts on the plasma and accelerates it to the nozzle 31. On the right side of FIG. 5, for simplicity, the nozzle 31 is not drawn as a whole, but only the contour of the axial hole in the nozzle 31 i.e., the hole for guiding the plasma to the workpiece 10. On the right side of FIG. 5, the capacitor 50 of a completely flat design is indicated. This is chosen for its extremely low inductance.

In the middle of FIG. 5, the first conductor 44 leading from the capacitor 50 to the first electrode 33 and the second conductor 46 leading from the capacitor 50 to the second electrode 66 are schematically indicated. Above the two electrodes 33 and 66 passes the polymer strip 32 provided with the metal foil 71 on the underside. The second conductor 46 is interrupted by a spark gap consisting of the spark gap input 80 and the spark gap output 81.

The capacitor 50 in the used embodiment is a dielectric layer 52 on its two flat sides—i.e., as shown in FIG. 5 above and below—provided with plates 53. Both conductors, the first conductor 44 and the second conductor 46, are connected to these capacitor plates 53, each conductor with one of the capacitor plate. As soon as an electric discharge occurs from the capacitor through the spark gap, the movement of the charge carriers is created not only in the conductors 44, 46, but also in the plasma formed from the material of the bridge 34. There, the charge carriers directed from the first electrode 33 to the second electrode 66 form an electric arc 30. The two conductors, 44 and 46, repel each other with great force and must therefore be fastened to prevent them from moving away from each other. For further explanation, one point is selected from this arc 30 in FIG. 5, to which the vectors of electromagnetic effects are then drawn. Tangentially to the movement of the charge carriers in the arc 30, an electric current vector 21 is drawn at the selected point. According to Faraday's law, a magnetic field is created around this vector of electric current 21. Here, the induction field line of this magnetic field 23 has a nearly circular shape.

The intensity of the magnetic field 22 at the monitored point is indicated by another vector, perpendicular to the electric current vector 21. Both mutually perpendicular vectors 21 and 22 determine the Lorentz force 20. Its vector at a given point is perpendicular to the two previous ones and thus points upwards in FIG. 5. This means that the Lorentz force 20 repels the charge carriers in the electric arc 30 in this direction upwards, i.e., into the nozzle 31. Due to the high current intensity, this is a very significant force contribution to the total force accelerating the projectile 100.

Example 3

The previous described illustrations were mainly a matter of explanation, since the acting effects represent spatially complicated relations that are difficult to depict in two-dimensional images. Significant simplifications have therefore necessarily been made in these previous figures. However, after these explanations, a third embodiment can now be described, shown in FIGS. 6, 7 and 8. This example describes in principle the embodiments realized or realizable. They are characterized by offering good efficiency in creating and firing projectiles 100. For this purpose, several modifications are required, in particular those which lead to an absolutely minimal inductance in the electrical circuit, thus shortening the duration of the discharge. This leads to the maximum achievable value of the instantaneous electrical power. It is desirable to make all conductors flat with a minimum height of dielectric between them. At the same time, the shortest possible conductors 44 and 46 with a minimum length between the capacitor 50 on the one hand, and the polymer strip 32 and the active bridge 34 on the other hand, are also desirable. This second small distance factor is now achieved in this case thanks to the fact that the capacitor 50 is directly an integral part of the generator of projectiles 100.

Figure 6:
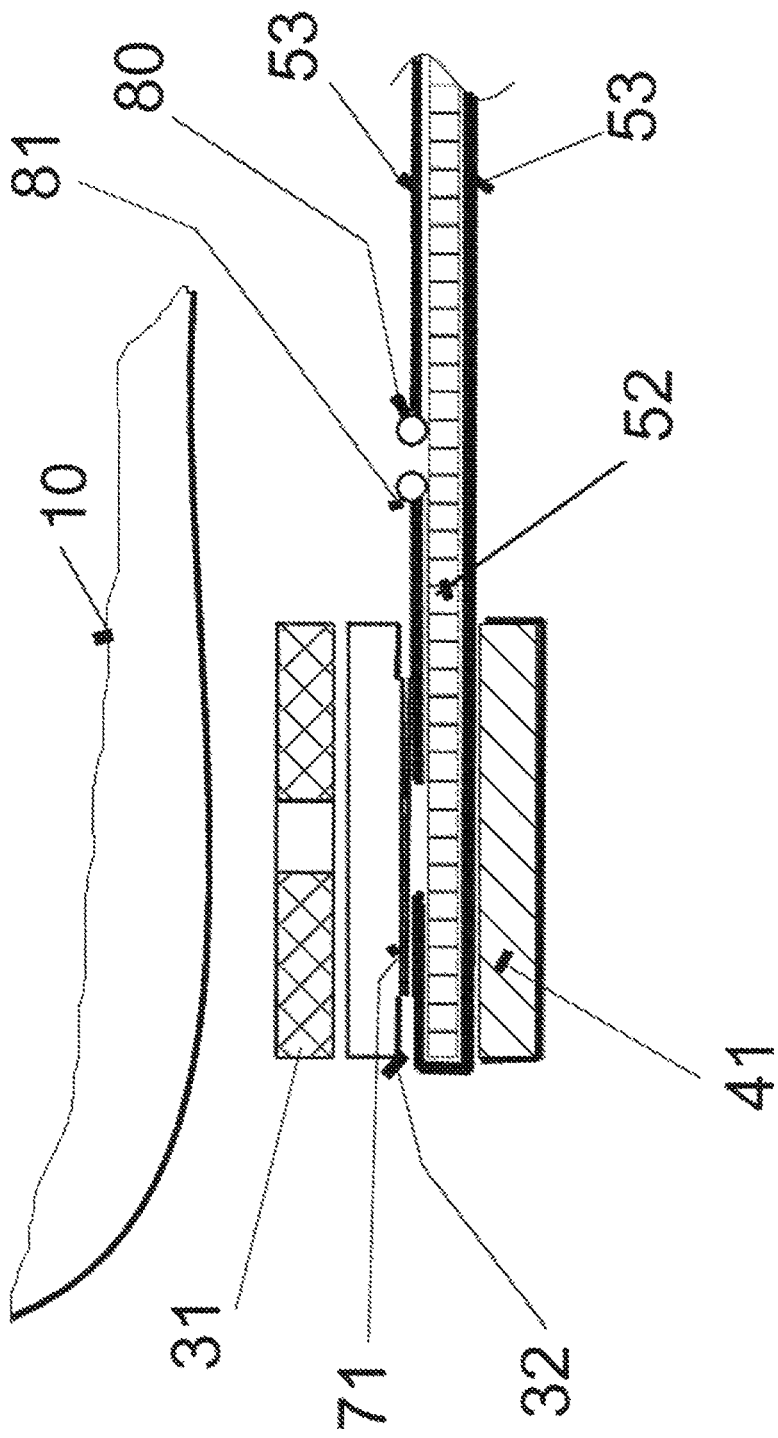
Figure 7:
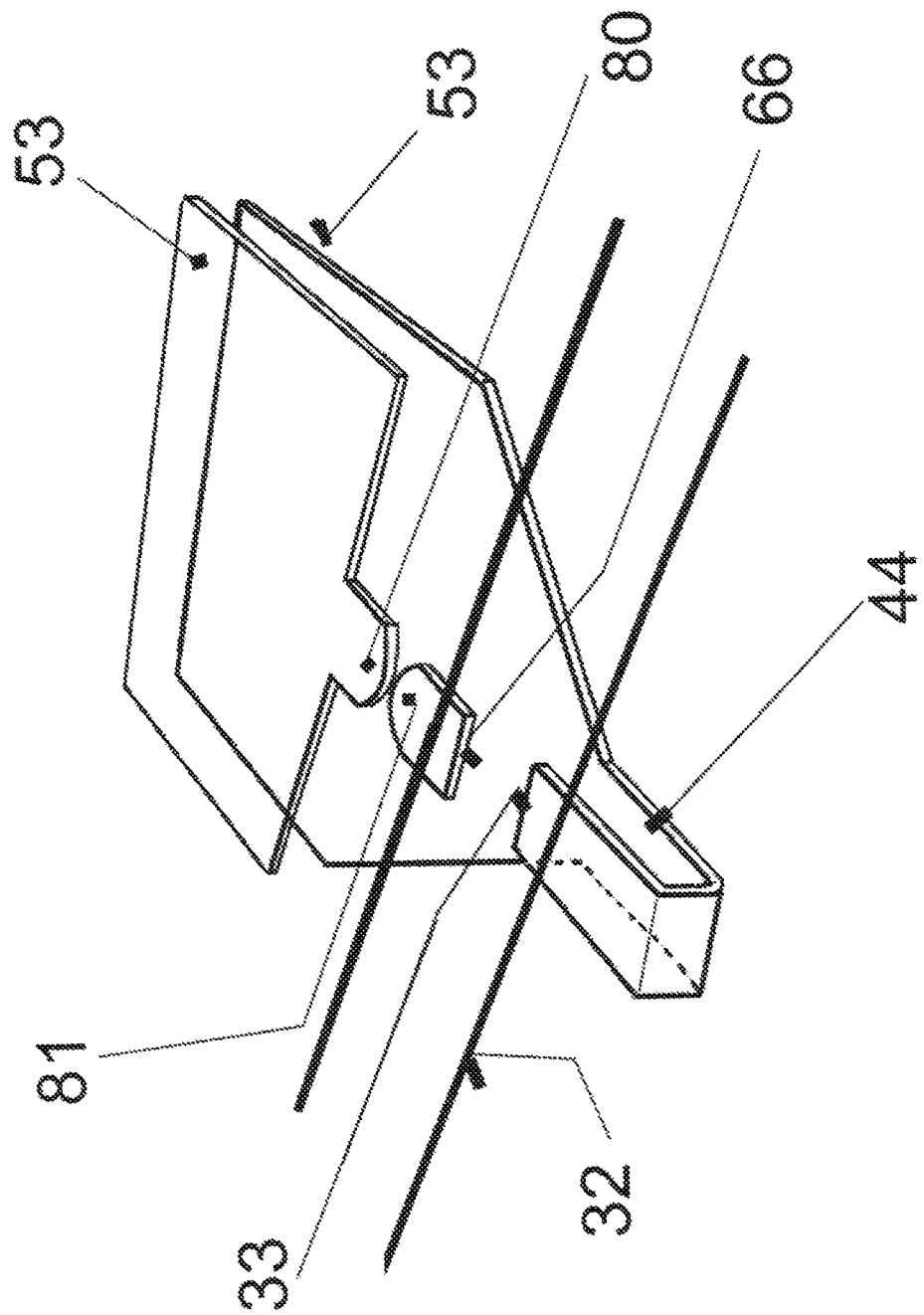

An exemplary embodiment is shown in FIG. 6 in a section through a vertical plane. The orientation of the components is the same as in the previous embodiments, i.e., with the workpiece 10 at the top, the nozzle 31 below it and with the support body 41 at the very bottom. Below the nozzle 31 there is a slit through which the polymer strip 32 passes with the deposited metal foil 71. However, in this arrangement, the polymer strip 32 moves differently through this slot, in a direction perpendicular to the projection plane, as shown in FIG. 5. In another figure of the same embodiment, i.e., in FIG. 7, perspective views of three conductive metal components of the generator of projectiles 100 are shown, showing the direction and position of movement of the polymer strip 32.

Figure 8:
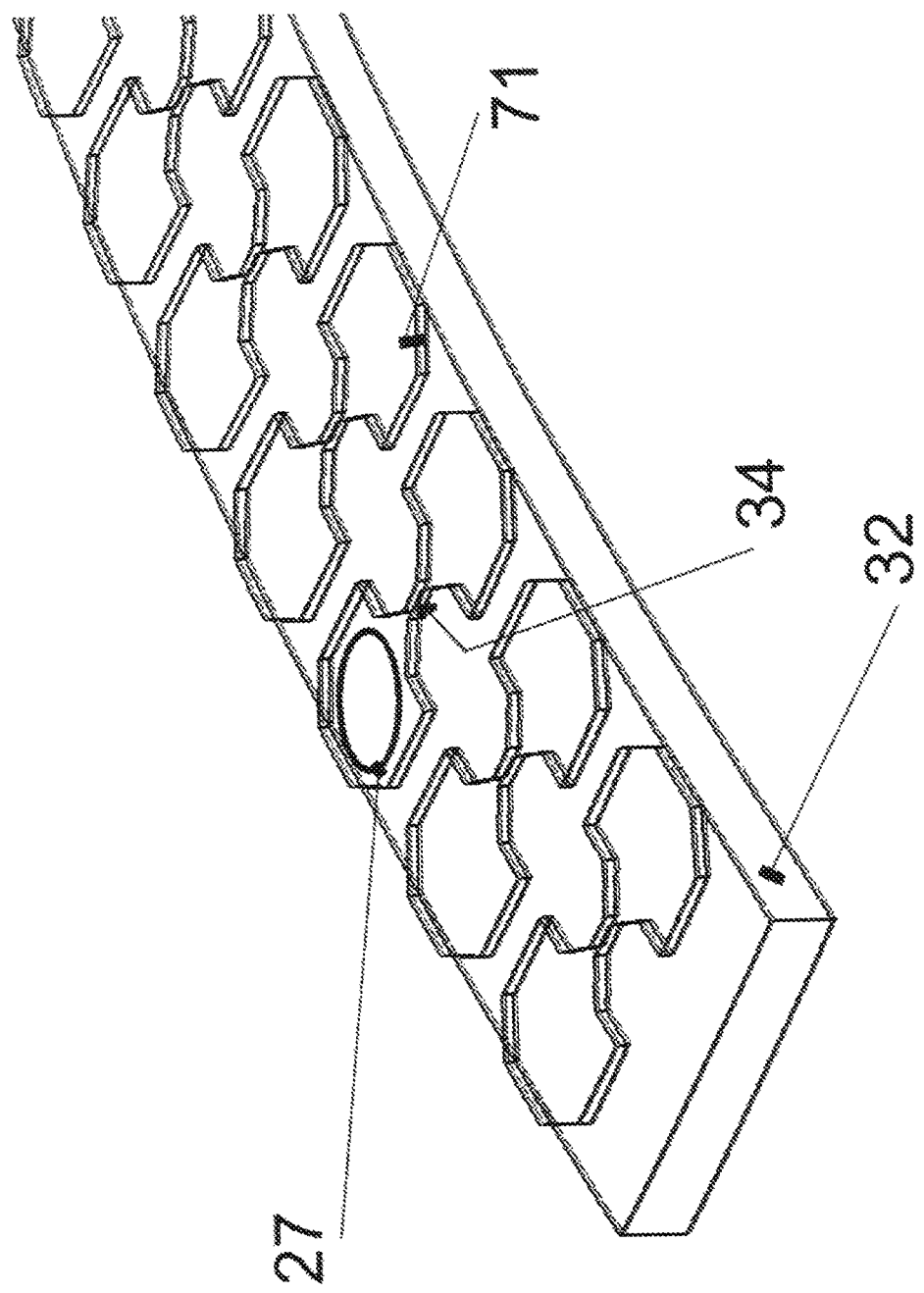

FIG. 8 then shows an embodiment of a polymer strip 32 with the deposited metal foil 71. In this exemplary embodiment, the polymer strip 32 has a different, in this case perpendicular orientation of the bridges 34 formed by the constriction of the metal foil 71. There is no dielectric 52 drawn, which would otherwise make the display of the whole device very complicated due to its spatially very complicated arrangement.

According to FIG. 6, the capacitor 50 as a part of the generator of projectiles 100 is formed by a dielectric layer 52 of constant thickness, reaching on the left side of the figure not only below the nozzle opening 31 but even further to the left below the edge above the support body 41. Basically, the dielectric 52 has a rectangular shape, which is complicated by a small protrusion that forms a spark gap input 80. The metal foil 71 on the upper side of the dielectric 52 reaches up to this gap inlet. Against this protrusion, which forms the input of the spark gap 80, there is situated an equally wide short metal protrusion separated by an air gap. It is held in position by the shaped protrusion of the dielectric plate 52. Although this short protrusion is only a small fabricated part, it performs two tasks. On the one hand, it is the spark gap output 81—and at the same time its part which is further from the capacitor 50 has the function of the second electrode 66. There is also the metal plate 53 on the underside of the dielectric layer 52, which also has several functions. In addition to its role of charge accumulation in the capacitor 50, it also has the function as the first conductor 44 leading to the first electrode 33. The polymer strip 32 extends above the dielectric 52 on both sides above the two electrodes 33 and 66. The corresponding points form the contact surface areas 27 on the metal foil 71 as shown in FIG. 8. The two contact surface areas 27 adjacent to each other in the width direction of the polymer strip 32 are always conductively interconnected via the bridge 34.

The function of the generator and accelerator of projectiles 100 differs from the embodiment described in connection with FIG. 2 only in the arrangement, where the polymer strip 32 is moved by the displacement device 35 in the direction of its length, while the electric arc 30 at the end of each functional cycle ignites in the direction of the width of the polymer strip 32, thus transversely to its length. That is why the polymer strip 32 must be quite wide, which can lead to certain complications.

Example 4

Figure 9:
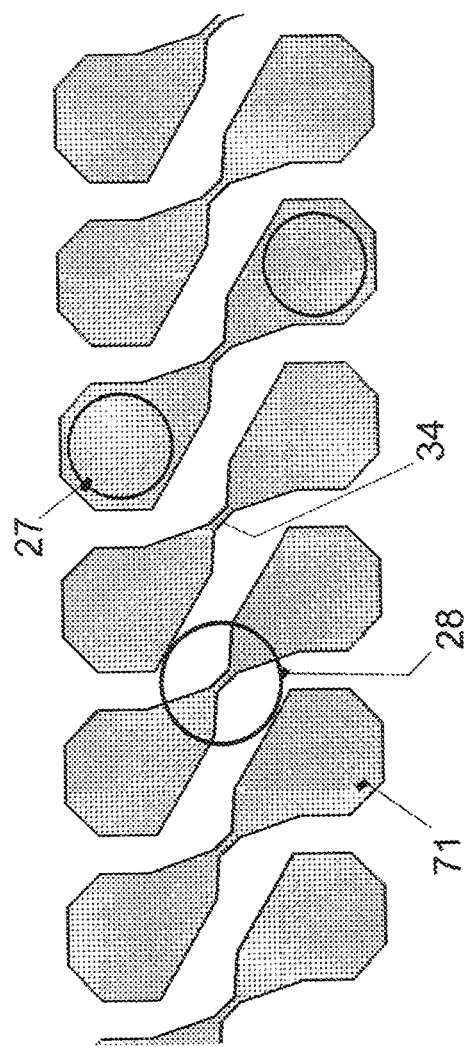
Figure 10:
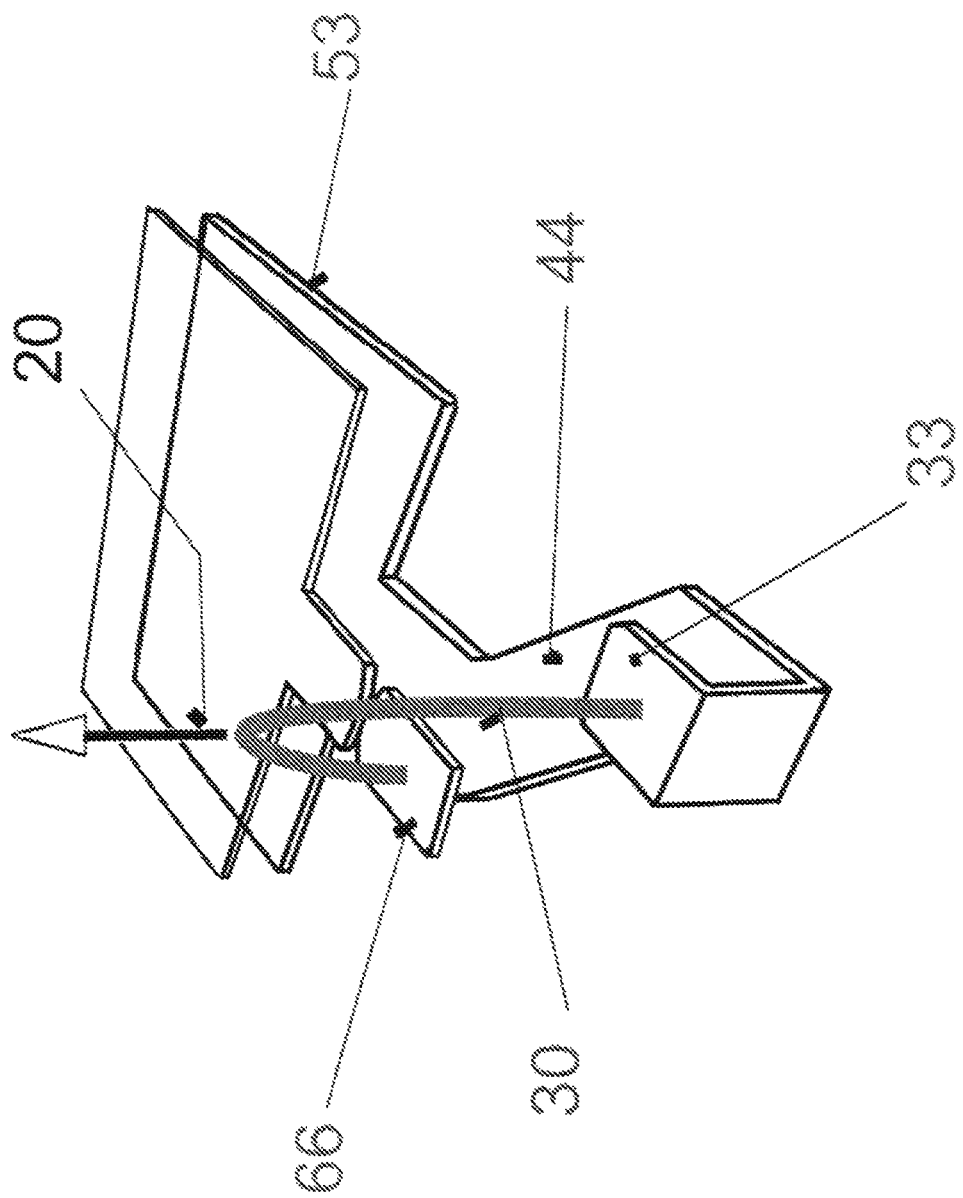
Figure 11:
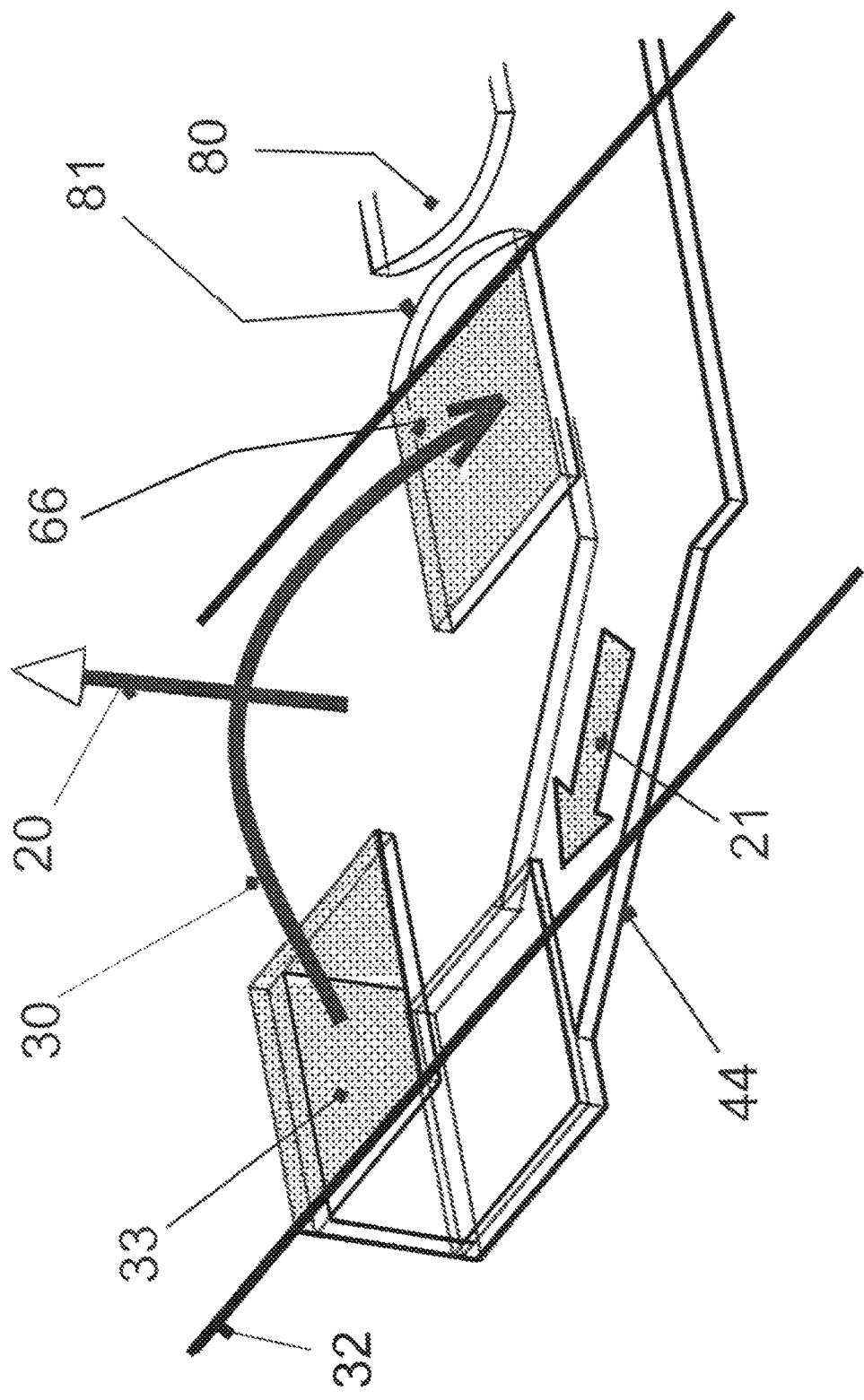

In this last, fourth described embodiment, shown in FIGS. 9, 10 and 11, a smaller width of the polymer strip 32 is achieved than is essential in the arrangement shown in FIG. 8. The narrower dimension is achieved by the diagonal arrangement of the elements of the metal foil 71, as shown in FIG. 9. These elements, i.e., the contact surface areas 27 interconnected by the bridges 34, must be shaped so that there is a sufficient free surface 28 around each of the bridges 34, as shown in FIG. 9, by its circular edge. The reason for this free area 28 is the intensity of the heat transferred from the bridge to the surrounding area. However, a sufficiently large contact area 27 must remain above each of the two electrodes 33 and 66.

The following FIGS. 10 and 11 then show the arrangement of the capacitor plates 53 of the capacitor 50, the conductors 44, 46 and the electrodes 33, 66 in this diagonal embodiment of the parts of the metal foil 71. Both cases—in FIG. 10 and in FIG. 11—are basically the same and differ from each other only by a different angle of view. The orientation of FIG. 10 is very similar to the arrangement shown in FIG. 7 described above. Also, here, the dielectric 52 is not drawn, as it would make the image of the whole device very complicated. There is not drawn the polymer strip 32 with a smaller width, which is guided in the same way as in FIG. 7. In FIG. 10 there is drawn a passing electric arc 30 between the first electrode 33 and the second electrode 66. There is indicated how the Lorentz force 20 lifts the arc 30 acting on the charge carriers by a force that pushes these carriers from the current of electrons in the first conductor 44, which is therefore also arranged diagonally.

Example 5

The device in the first variant embodiment shown in FIG. 12, where in the upper part the workpiece 10 is indicated in close contact with the polymer strip 32, which is intended to electrically isolate the workpiece from the high voltage circuit and to protect the workpiece from contamination by products caused by evaporation of the foil bridge and ablation of a portion of the polymer strip 32. A particularly suitable material for making the polymer strip 32 is polyimide, of which a thickness of up to 25 micrometres is sufficient. However, gluing is unsuitable for connecting it to the foil bridge because the extra. layer of glue unnecessarily absorbs part of the energy of the shock wave. The metal foil 71, narrowed at the location of the bridge 34, is in direct contact with the electrodes 33 and 66 by the contact surface 27. The metal foil 71 and the polymer strip 32 are shaped as shown in FIG. 14a. FIG. 14b shows the openings for the electrodes 33 and 66 in the insulation layer 37.

The electrodes 33 and 66 pass through the holes made in the second insulation layer 37, which isolates the exploding bridge from the support body 41 and thus protects it from plasma ablation. The second insulating layer 37 also enables one to make the support plate 41 of electrically conductive metallic materials. The material for making the second insulating layer 37 may again be polyimide, but cheaper and thicker materials may be advantageously used, e.g., Bi-PET, which can be connected with the polymer strip 32 and foil 71 by gluing. Here, a thicker layer between the metal foil 71 and the support plate 41 is an advantage, as it protects the support plate 41. A suitable material for the support plate 41 is, e.g., molybdenum, which has a high degree of wear resistance, and is also a suitable material for the electrodes 33 and 66, so that the support plate 41 and the electrode 33 can be made as a single component. The spark gap formed by the leads 80 and 81 is additionally equipped with an auxiliary trigger electrode 86 which is controlled by the high voltage switching pulse at a selected moment and allows the spark gap to operate at a lower voltage than a self-breakdown discharge voltage, as in prior art embodiments. This makes it possible to set the required discharge energy by adjusting the voltage of the capacitor and to trigger the spark gap by means of the auxiliary trigger electrode 86.

Example 6

The device in the second variant embodiment shown in FIG. 13, where in the upper part the workpiece 10 is again shown in close contact with the polymer strip 32, which is intended to electrically isolate the workpiece from the high voltage circuit and to protect the workpiece from contamination by-products caused by evaporation of the foil bridge and ablation of a portion of the polymer strip 32, as in the example of the first variant embodiment.

However, for the sake of clarity of the illustration, in FIG. 13 these components are drawn vertically offset relative to each other, so that there is a gap between them in the figure. The function is similar to that described in the embodiment of Example 1, but the spark gap is transferred to the opposite side and its input 81 is connected to the support plate 41 and the electrode 66 as one piece (e.g., by brazing). It enables better cooling and at the same time the spark gap does not restrict access to the workpiece 10. Since the working current passes through the support plate 41 and a high voltage appears on it for a short time, it is necessary to mount it electrically insulated. The protective film 54 protects the dielectric of the strip line from burn-off of the spark gap electrodes and thus significantly increases its service life. A suitable material is polyimide, polytetrafluoroethylene, or a slice of mica.

Spark gap input 80 and spark gap output 81 can be operated in air at normal pressure, but to increase the service life of the electrodes and insulators, it is very convenient to fill it with nitrogen to prevent oxidation of the electrodes and the formation of ozone, which attacks polymer parts. By increasing the working gas pressure, it is possible to further reduce the inter-electrode gap distance for a given breakdown voltage and to reduce the parasitic inductance of the spark gap.

INDUSTRIAL UTILIZATION

The invention is particularly applicable to mechanical engineering, in particular in the aerospace industry and in general where mechanically highly stressed components are produced, where it serves to strengthen the surface of workpieces, in particular metal ones, by mechanical effects accompanying the impact of small projectiles, when the impact of the projectile causes plastic deformations in the surface layer of the workpiece and introduce residual mechanical stresses, which cause a significant improvement in the functional mechanical properties of the final product, in particular an increase in the mechanical, cavitation, adhesion and corrosion resistance of the surface.

LIST OF REFERENCE MARKS

10—Workpiece
20—Lorentz force
21—Electric current
22—Magnetic field intensity
23—Field line of magnetic induction
27—Contact area
28—Free area
30—Electric arc
31—Nozzle
32—Polymer strip
33—First electrode
34—Bridge
35—Displacement mechanism
37—Insulation layer
41—Support body
44—First conductor
46—Second conductor
50—Capacitor 52—Dielectric
53—Capacitor plate
54—Protective film
61—Traverser
66—Second electrode
71—Metal foil
80—Spark gap input
81—Spark gap output
82—Parasitic inductance
83—High voltage source
84—Switch
85—Insulation
86—Auxiliary trigger electrode
90—Explosion
91—Polymer waste
93—Sharp edge
100—Projectile

What is claimed is:

1. A device for strengthening a surface of a workpiece by introducing compressive stress, wherein
the device comprises a polymer strip which is provided with a metal foil on a surface of a side diverted from the surface of the workpiece in which foil bridges are formed to form projectiles, and the device further comprises two electrodes adhering to the metal foil located on the polymer strip, where the foil bridges are formed between contact surface areas of the metal foil,
wherein the electrodes, between which a plasma is formed, are mounted in a support body, via which they are connected by conductors to a switch for switching currents and voltages with a voltage source,
wherein the polymer strip provided with the metal foil adheres to the support body with the electrodes, and the electrodes protrude above an upper surface of the support body to provide electrical contact with the contact surface areas of the metal foil,
wherein for guiding and accelerating the projectiles, the device further contains a nozzle provided with an edge located on a lower side of an inlet opening of the nozzle, where the inlet opening of the nozzle is orientated towards the surface of the workpiece being strengthened.

2. The device of claim 1, wherein the metal foil is locally narrowed to form the foil bridges at periodically recurring longitudinal distances between the contact surface areas.

3. The device of claim 1, wherein the polymer strip is made of bi-axially oriented polyethylene terephthalate or polyimide.

4. The device of claim 1, wherein for the accumulation of energy necessary for the generation of plasma, the device comprises a capacitor to be charged from the voltage source, where the capacitor on an external surface of the capacitor comprises plates surrounding a dielectric plate with constant thickness, where the plates are connected to conductors.

5. The device of claim 4, wherein the capacitor is made as a part of a generator of the projectiles so that the capacitor is at least partially positioned between the support body and the polymer strip provided with the metal foil,
wherein at the location of the electrodes, the polymer strip is mounted perpendicularly to an axis connecting the electrodes and the polymer strip extends above the dielectric plate above the two electrodes, the two electrodes comprising an electrode located above the dielectric plate,
wherein the conductor passing under the dielectric plate is connected to the electrode located above the dielectric plate.

6. The device of claim 1, wherein the conductors are provided with electric insulation with dielectric strength resistant to high voltage of at least 2 to 5 KV.

7. The device of claim 1, wherein the switch has the form of a spark gap having a spark gap input and a spark gap output, where the spark gap input and the spark gap output are separated from each other, and the device comprises an auxiliary electrode for switching.

8. The device of claim 1, wherein a value of surface density of the foil bridges corresponds to a value of surface density of the polymer strip.

9. The device of claim 1, wherein each of the foil bridges conductively connects exactly one pair of contact surface areas oriented transversely or diagonally to a longitudinal axis of the polymer strip.

10. A device for strengthening a surface of a workpiece by introducing a compressive stress, where the device comprises a polymer strip which is provided with a metal foil on a surface of a side diverted from the surface of the workpiece in which foil bridges are formed to create a plasma,
and the device further comprises two electrodes adhering to the metal foil located on the polymer strip, where the foil bridges from which the plasma is created are formed between contact areas of the metal foil, where the electrodes are mounted in a support body, via which they are connected by conductors to a switch for switching currents and voltages with a voltage source,
where, for the accumulation of the energy necessary for the generation of plasma, the device comprises a capacitor to be charged from the voltage source,
where the capacitor on its external surface comprises plates surrounding a dielectric plate with constant thickness, where the plates are connected to the conductors,
where the switch has the form of a spark gap having a spark gap input and a spark gap output, where the spark gap input and the spark gap output are separated from each other,
where both the spark gap input and the spark gap output are formed on the conductor, and the capacitor is at least partially interposed between the support body and the polymer strip provided with the metal foil,
wherein the polymer strip electrically insulating the workpiece from the voltage is placed in contact with the workpiece,
wherein the device comprises a second insulation layer isolating the foil bridges from the support body and protecting the support body from plasma ablation, where the electrodes pass through holes in the second insulation layer.

11. The device of claim 10, wherein the polymer strip is made of polyimide.

12. The device of claim 10, wherein the second insulation layer is glued to the polymer strip and the metal foil.

13. The device of claim 10, wherein the spark gap comprises a trigger electrode for controlling the switching by a voltage pulse.

14. The device of claim 10, wherein the conductors are flat in shape, with a width greater than a thickness.

15. The device of claim 10, wherein to protect the dielectric plate at the location of the spark gap input and the spark gap output, the dielectric plate is provided with a protective foil.

16. The device of claim 10, wherein the space between the spark gap input and the spark gap output of the spark gap is filled with nitrogen.

17. A method for strengthening a surface of a workpiece using the device of claim 1, wherein one cycle of strengthening the surface of the workpiece involves the action of an electric current pulse supplied from the voltage source after closing the switch via the conductors to the electrodes, between which a voltage is introduced, thereby short-circuiting a circuit on the metal foil at the location of the foil bridges to form a plasma expanding and applying a compressive force to the polymer strip, part of which hits, as the projectiles, the surface of the workpiece, wherein the plasma generated by the electric current pulse, in addition to an expansion pressure, is also accelerated by electromagnetic Lorentz force caused by passage of an electric current through the plasma in a magnetic field.

18. The method of claim 17, wherein after the expansion of the plasma, a part of the polymer strip is cut by the edge of the nozzle and subsequently accelerated by a compressive force through the inlet opening of the nozzle, as the projectile, onto the surface of the workpiece.

19. The method of claim 17, wherein the surface of the workpiece is treated in periodically repeating cycles.

20. The method of claim 17, wherein the switch is closed when a voltage difference at a spark gap between a spark gap input and a spark gap output exceeds a value of electrical strength of a space between the spark gap input and the spark gap output.

* * * * *